(12) United States Patent
Gitz et al.

(10) Patent No.: US 11,099,018 B2
(45) Date of Patent: Aug. 24, 2021

(54) ROUTE PLANNER FOR WORK MACHINES

(71) Applicant: Caterpillar Inc., Deerfield, IL (US)

(72) Inventors: David Gitz, Peoria, IL (US); Maikel Torres, Peoria, IL (US); Qi Chen, Canton, MI (US)

( * ) Notice: Subject to any disclaimer, the term of this patent is extended or adjusted under 35 U.S.C. 154(b) by 267 days.

(21) Appl. No.: 16/201,747

(22) Filed: Nov. 27, 2018

(65) Prior Publication Data

US 2020/0166350 A1 May 28, 2020

(51) Int. Cl.
*G01C 21/34* (2006.01)
*B60R 1/00* (2006.01)
*G01C 21/36* (2006.01)

(52) U.S. Cl.
CPC ............ *G01C 21/3415* (2013.01); *B60R 1/00* (2013.01); *G01C 21/367* (2013.01); *G01C 21/3632* (2013.01)

(58) Field of Classification Search
CPC .............. G01C 21/3415; G01C 21/367; G01C 21/3632; G01C 21/3629; G01C 21/36; G01C 21/20; B60R 1/00; B62D 15/0295
USPC ......................................................... 701/411
See application file for complete search history.

(56) References Cited

U.S. PATENT DOCUMENTS

| | | | |
|---|---|---|---|
| 8,583,361 B2 | 11/2013 | Lewis et al. | |
| 8,954,241 B2 | 2/2015 | Ruth | |
| 9,464,913 B2 | 10/2016 | Brown et al. | |
| 2008/0208461 A1* | 8/2008 | Gharsalli | G01C 21/32 701/425 |
| 2016/0311465 A1* | 10/2016 | Friend | G01B 7/30 |
| 2019/0170521 A1* | 6/2019 | Elhoushi | G01C 21/34 |

\* cited by examiner

*Primary Examiner* — Mahmoud S Ismail
(74) *Attorney, Agent, or Firm* — von Briesen & Roper, s.c.

(57) ABSTRACT

A method of maneuvering a work machine is disclosed comprising receiving a signal indicative of an actual position of a work machine, and determining a route to maneuver the work machine from the actual position to a target position. When a distance between the actual location and the target location is greater than a straight-distance threshold, the route comprises a curved portion between the actual position and a straight-distance threshold point and a straight portion between the straight-distance threshold point and the target position. When the distance between the actual location and the target location is less than the straight-distance threshold, the route comprises the straight portion. The method further includes displaying a determined path and an indicator.

20 Claims, 5 Drawing Sheets

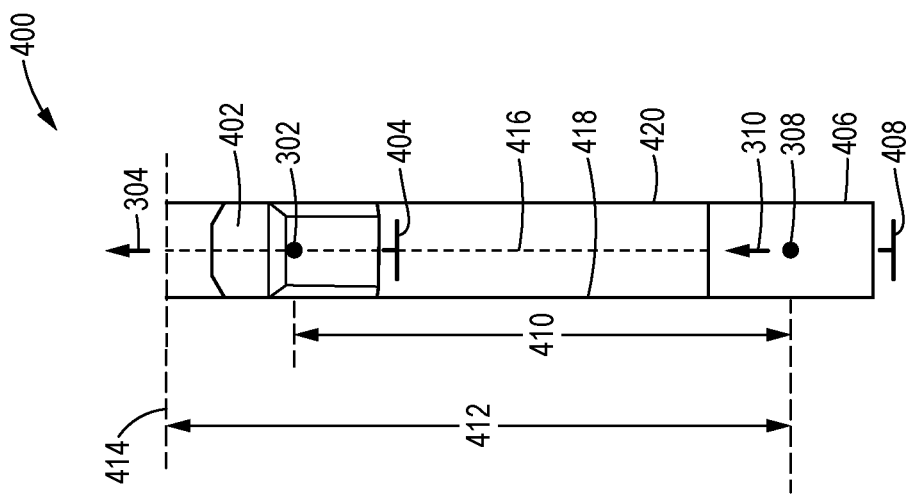
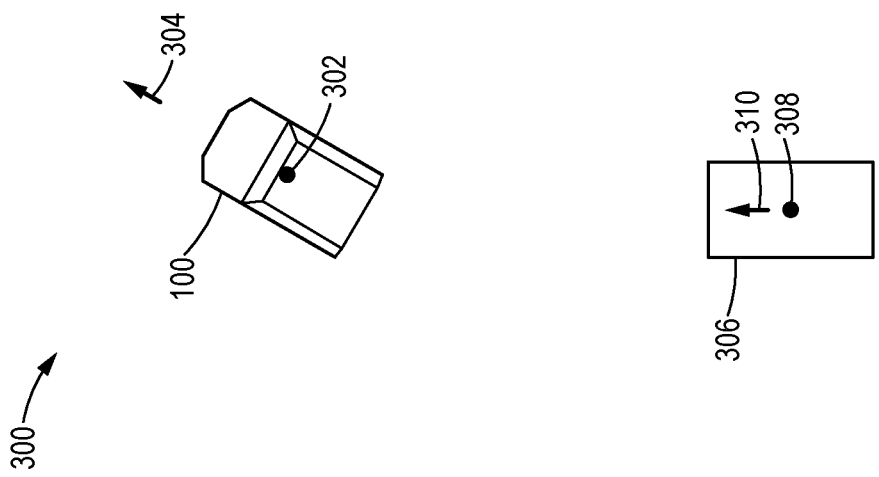

ROUTE PLANNER FOR WORK MACHINES

TECHNICAL FIELD

The present disclosure relates to an operator assistance system for a work machine, and more specifically to a system for assisting an operator in maneuvering the work machine on a worksite.

BACKGROUND

Modern day worksites are complex. They may be large scale and be comprised of many acres of open space, or they may be compact and set in a busy urban environment. Moreover, the size and placement of machines or natural obstacles on the worksite may contribute to the difficulty of complex maneuvers of a work machine around a work site.

This is particularly true with large work machines. For example, with a modern day mine, a large mining truck (LMT) may be the size of a building itself. Moving such a work machine around obstacles and other machines on the worksite may be very challenging.

Some work machines utilize a rear parking assistance systems that include one or more rear view cameras to provide a view behind the work machine to the operator. Additionally, proximity sensors may also be utilized in known systems to indicate the presence of nearby obstacles and/or distance of the work machine from the obstacles. However, maneuvering of work machines on a worksite remains a complex task. It is desired to quickly communicate the intended routes of the work machine to an operator. Such communications are facilitated by displaying instructions and indications of the intended route in an intuitive manner to the work machine operator.

For example, U.S. Patent Application No. 2016/0311465 discloses a method for assisting a maneuver of a motor vehicle in which a first indicator indicative of the actual position and the actual orientation of the machine is displayed along with the display of a second indicator indicative of a target position and target orientation of the machine. However, there still remains need for improvement of these systems and methods.

SUMMARY OF THE DISCLOSURE

In one aspect of the disclosure, a method is disclosed. The method includes receiving a signal indicative of an actual position of a machine, the actual position having an actual location and an actual orientation of the machine. A route to maneuver the machine from the actual position to a target position is determined, with the target position having a target location and a target orientation. When a distance between the actual location and the target location is greater than a straight-distance threshold, the route includes a curved portion between the actual position and a straight-distance threshold point and a straight portion between the straight-distance threshold point and the target position. When the distance between the actual location and the target location is less than the straight-distance threshold, the route includes the straight portion that is perpendicular to the target position. A path, based on the determined route, is displayed to an operator of the machine. An indicator representative of a lateral offset of the machine to the target location is also displayed.

In another aspect of the present invention, a system for assisting an operator to maneuver a machine on a worksite is disclosed. The system includes a position detection module, a display unit, and a controller. The position detection module is configured to generate a signal indicative of an actual position having an actual location and an actual orientation of the machine. The controller is communicably coupled to the position detection module and the display unit. The controller configured to receive the signal indicative of the actual position of the machine, determine a route to maneuver the machine from the actual position to a target position having a target location and a target orientation, display a path based on the route, and display an indicator indicative of a lateral offset of the machine to the target position. When a distance between the actual location and the target location is greater than a straight-distance threshold, the route comprises a curved portion between the machine a straight-distance threshold point and a straight portion between the straight-distance threshold point and the target position. When the distance between the actual location and the target location is less than the straight-distance threshold, the route comprises the straight portion that is perpendicular to the target position.

In yet another aspect of the present disclosure, a machine is disclosed. The machine includes a frame supported by a plurality of ground engaging members, with two ground engaging members in the plurality of ground engaging members being configured to turn to turn the frame of the machine along a turning radius and at least one ground engaging member in the plurality of ground engaging members is configured to drive the machine. The machine also includes a position detection module configured to generate a signal indicative of an actual position having an actual location and an actual orientation of the machine, a display unit; a controller communicably coupled to the position detection module and the display unit. The controller is configured to receive the signal indicative of the actual position of the machine, determine a route to maneuver the machine from the actual position to a target position having a target location and a target orientation, display a path based on the route, display a target position indicator representative of the target position and the target orientation of the machine, and display an indicator representative of a lateral offset of the machine. When a distance between the actual location and the target location is greater than a straight-distance threshold, the route comprises a curved portion between the machine and a straight-distance threshold point and a straight portion between the straight-distance threshold point and the target position. When the distance between the actual location and the target location is less than the straight-distance threshold, the route comprises the straight portion that is perpendicular to the target position.

These and other aspects and features of the present disclosure will be more readily understood when read in conjunction with the accompanying drawings.

BRIEF DESCRIPTION OF THE DRAWINGS

FIG. 3 is an exemplary view of a worksite, in accordance with an embodiment of the present disclosure;

FIG. 4 is an exemplary view of a first scenario, in accordance with an embodiment of the present disclosure;

DETAILED DESCRIPTION

Figure 1:
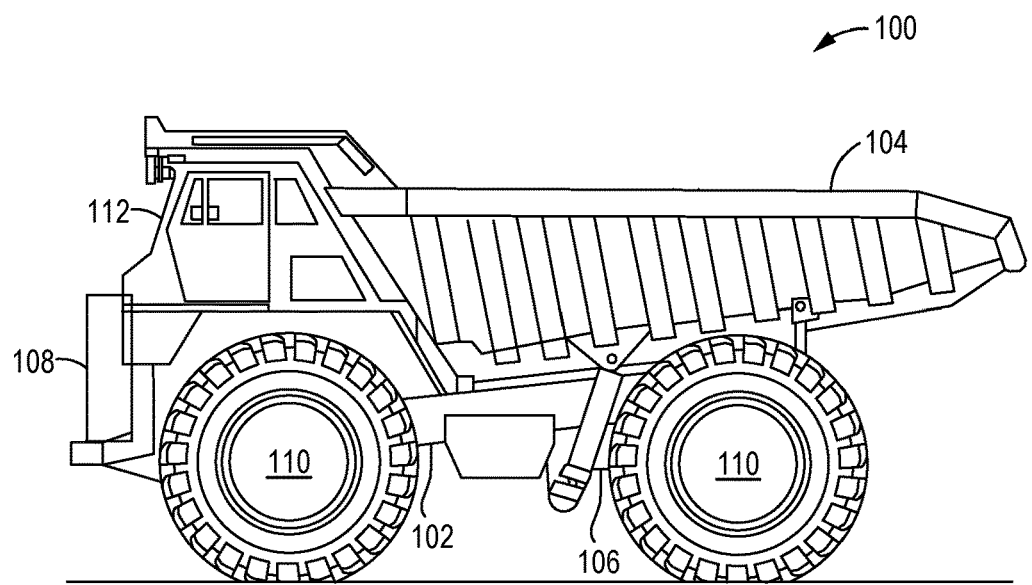
FIG. 1 is an exemplary machine, according to one embodiment of the present disclosure.

Wherever possible, the same reference numbers will be used throughout the drawings to refer to the same or the like parts. FIG. 1 is an exemplary machine, according to one embodiment of the present disclosure. In particular, FIG. 1 depicts the work machine 100, which may be realized as a haul truck. It should be noted that the work machine 100 may include any other industrial machine including, but not limited to, a large mining truck, an articulated truck, an off-highway truck, and the like. In another embodiment, the work machine 100 may be one of various types of machinery used in a number of industries such as mining, agriculture, construction, forestry, waste management, and material handling, among others.

The work machine 100 may include a chassis and/or a frame 102. A dump body 104 may be fixedly or pivotally mounted on the frame 102. The dump body 104 may be used for transportation of a payload of material like sand, gravel, stones, soil, excavated material, and the like from one location to another on a worksite on which the work machine 100 is deployed.

Hydraulic and/or pneumatic cylinders 106 may be mounted on the frame 102 and connected to the dump body 104 to enable movement in the form of tilting of the dump body 104 with respect to the frame 102 of the work machine 100. The tilting of the dump body 104 may result in the payload contained within the dump body 104 to be deposited on a ground surface behind the work machine 100. In some embodiments, the distance behind the work machine 100 that the payload is deposited may be determined and stored for more accurate positioning of the work machine 100 at a target position.

A powertrain or a drivetrain (not shown) may be provided on the work machine 100 for the production and transmission of motive power. The powertrain may include an engine. An enclosure 108 may be provided on the frame 102 of the work machine 100 which may house the engine. The engine may be an internal combustion engine, a gas turbine, a hybrid engine, a non-conventional power source like batteries, or any other power source known in the art.

A set of ground engaging members 110, like wheels, may be provided to the work machine 100 for the purpose of mobility. The set of ground engaging members may be steerable, or configured to turn, in order to turn the frame of the work machine 100 along a turning profile. In some embodiments, the front two ground engaging members 110 are configured to turn. The powertrain may further include a torque convertor, transmission inclusive of gearing, drive shafts, propeller shaft, differentials and other known drive links for transmission of motive power from the engine to the at least one ground engaging member in the plurality of ground engaging members 110. An operator cabin 112 may be provided on the work machine 100 which may house the various controls of the work machine 100.

The work machine 100 may be configured to transport materials from one location to another at a worksite. For example, the work machine 100 may maneuver to a first target position to receive a payload in its dump body 104 from an excavating machine, transport the payload to a second target position, and dump the payload at the second target position. Each of the first and second target positions may be associated with a target location for the machine and a target orientation for the machine (e.g., a heading direction for the machine). Other example target positions may include parking spots, maintenance spots, refueling spots, any other pre-decided destination, and the like.

Figure 2:
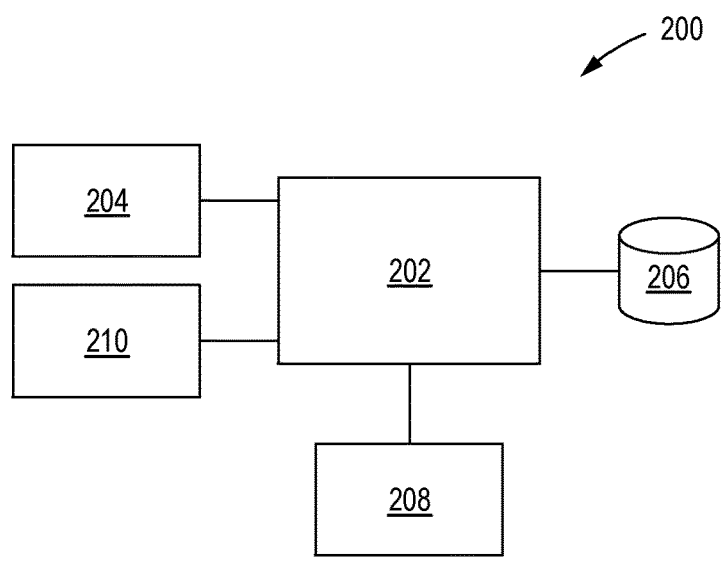
FIG. 2 is a block diagram of an operator assistance system, in accordance with an embodiment of the present disclosure.

FIG. 2 is a block diagram of an operator assistance system, in accordance with an embodiment of the present disclosure. In particular, FIG. 2 depicts the operator assistance system 200 that includes a controller 202, a position detection module 204, a database 206, a display unit 208, and an image capturing device 210. The operator assistance system 200 is configured to assist the operator in backing up the work machine 100 to a target position having both a target location and a target orientation.

The controller 202 is communicably coupled to the position detection module 204. The position detection module 204 is configured to determine an actual position of the work machine 100, the actual position having an actual location and an actual orientation of the machine. The position detection module 204 may be any one or a combination of a Global Navigation Satellite System, a Global Positioning System, any other Satellite Navigation System, an Inertial Navigation System, an Augmented Navigation System or any other known positioning system. In some embodiments, the position detection module 204 is configured to determine a relative distance and a relative heading differential between the actual position of the work machine 100 and the target position (e.g., visual object detection, a radio-frequency identification location system, or the like). While in some embodiments, the position detection module 204 is configured to generate a signal indicative of an actual position of the work machine 100 on the worksite, the position detection module 204 may also be configured to determine and generate a relative position between the actual position of the machine and the target position of the machine. In some embodiments, the position detection module 204 is present on board the work machine 100. In other embodiments, it may be realized by a remote module in communication with the work machine 100.

The controller 202 may further be configured to receive a signal indicative of the actual position of the machine and determine a route to maneuver the machine from the actual position to a target position, as disclosed in more detail throughout. In one embodiment, the controller 202 may retrieve the data associated with the worksite 300 from the database 206 in order to determine the actual position of the work machine 100 on the worksite 300, and more specifically with respect to the target position 306 on the worksite 300.

The database 206 may be communicably coupled to the controller 202 via a communication network (not shown). The communication network may be implemented as a wired network, a wireless network or a combination thereof. The communication network may be, but not limited to, a wide area network (WAN), a local area network (LAN), an Ethernet, Internet, an Intranet, a cellular network, a satellite network, or any other suitable network for providing communication between the database 206 and the controller 202.

The database may store information related to the work machine 100, such as a turning profile of the work machine 100, a straight-distance threshold, payload dumping characteristics, or the like.

The database 206 may contain data relating to the respective worksite 300 on which the work machine 100 is employed. The data stored in the database 206 may include a site map, site terrain, and/or data relating to other machines employed on the worksite 300. Further, the database 206 may also store coordinates or location data related to the target position 306 of the work machine 100 on the worksite 300. Additionally, the database 206 may store data related to the target orientation 310 of the work machine 100 on the worksite 300. In one embodiment, the target position 306 may be manually fed to the operator assistance system 200 through an interface (not depicted). For example, the target position 306 may be input by an operator via an operator interface device present on the work machine 100. Alternatively, an on-board system of the work machine 100 may determine the target position 306 based on, for example, the location, the orientation, and physical characteristics of the work machine 100. In yet another case, the on-board system on the work machine 100 may be communicably connected to an off-board remote command station through a communication system present on the work machine 100. In this case, the controller 202 may receive the target position and the target orientation from the remote command station.

One of ordinary skill in the art will appreciate that the database 206 may be any conventional or non-conventional database known in the art, like an oracle-based database. Moreover, the database 206 may be capable of storing and/or modifying pre-stored data as per operational and design needs. In one embodiment, the database 206 may be extrinsic to the work machine 100 and located at a remote location away from the work machine 100. Alternatively, the database 206 may be intrinsic to the work machine 100.

Furthermore, as shown in FIG. 2, a display unit 208 may be communicably coupled to the controller 202. Based on the actual position of the work machine 100 relative to the target position, the controller 202 is configured to display a path based on a determined route and display an indicator representative of a lateral offset of the machine to the target position. In some embodiments, the display is an overhead-view display, and in other embodiments, the display is an overlay on a video feed of a back-up camera. The display unit 208 may be located in the operator cabin 112 of the work machine 100 and visible to an operator of the work machine 100. The display unit 208 may be an LCD device, an LED device, a CRT monitor, a touchscreen device, an augmented reality display, a heads-up display, or any other known display device known in the art.

In some embodiments, an image capturing device 210 may be provided on the work machine 100 and communicably coupled to the controller 202. The image capturing device 210 may include a CCD camera, a CMOS camera, a night vision camera or any other image capturing and/or processing device known in the art. The image capturing device 210 may be configured to provide a rearward view with respect to the work machine 100. Accordingly, the controller 202 may be configured to superimpose a display of the work machine 100 on the worksite onto the feed received from the image capturing device 210, and display the same on the display unit 208.

Additionally, proximity sensors (not shown) like infrared sensors, ultrasonic sensors, laser sensors or the like may also be provided on the work machine 100. The proximity sensors may be configured to determine the proximity of the work machine 100 to obstacles present on the worksite, such as, for example, personnel working on the worksite, other machines, constructions walls, pillars, etc., heaps of construction materials on the worksite, and the like. These signals from the proximity sensors may be sent to the controller 202, and the controller may further be configured to display the presence of the detected obstacles on the display unit 208.

In another aspect of the current disclosure, a steering angle sensor (not depicted) may be installed on the work machine 100 and communicably coupled to the controller 202. The steering angle sensor may be any one or a combination of an accelerometer, a compass, a magnetometer, a gyroscope, and the like. The steering angle sensor may be configured to send signals to the controller 202 indicative of the steering angle of the work machine 100, dynamic orientation and/or a direction in which the work machine 100 is headed. The signal generated by the steering angle sensor, indicative of the actual orientation of the work machine 100, may be sent to the controller 202. Further, the controller 202 may include data received from the steering angle sensor in the displayed views of the work machine 100 on the worksite.

Additionally, real time information like, but not limited to, actual position and coordinates, the target position and coordinates, distance from the nearby obstacles, distance from the target position, steering angle, angle between the actual position and the target position of the work machine 100, preferred route of heading, deviation from the target orientation and various other information may also be included in the views displayed on the display unit 208. In some embodiments, the display unit 208 is used for normal operations and may display information relevant to the current operations at hand. In response to detecting a maneuver to a target position, the controller cause the display unit 208 to display the views disclosed herein.

FIG. 3 is an exemplary view of a worksite, in accordance with an embodiment of the present disclosure. In particular, FIG. 3 depicts an overhead view of a worksite 300. The worksite 300 includes the work machine 100 positioned at the actual location 302, shown as the center point of the work machine 100. The work machine 100 also has an actual orientation 304 that corresponds to the heading of the work machine 100. Also depicted in the overhead view of the worksite 300 is a target position 306 having a target location 308, at the center point of the target location 308, with a target orientation 310 that corresponds to the desired heading of the work machine 100 when at the target location 308. The target position 306 corresponds to a desired location and desired orientation of the work machine 100. The work machine 100 may be desired at the target position 306 on the worksite 300 for maintenance, loading or unloading of a payload, parking, or the like.

FIG. 4 is an exemplary view of a first scenario, in accordance with an embodiment of the present disclosure. In particular, FIG. 4 depicts the view 400 of a first scenario of an overhead view that is displayed on the display unit 208 in some embodiments. The view 400 includes a representation of the machine 402 at the actual location and the actual orientation on the worksite (e.g., actual location 302 and actual orientation 304 on the worksite 300 of FIG. 3). Also depicted on the overhead view 400 is a location of the target position 406, relative to the representation of the machine 402. The target position 406 corresponds to the target position 306 of FIG. 3.

In some embodiments, a straight-distance threshold point 414 is displayed as a line on the display unit 208. The straight-distance threshold point 414 may also be displayed as an arc, be displayed as a solid line, displayed as a dashed line, or the like. The straight-distance threshold point 414 is depicted at a location that corresponds to the straight-distance threshold. The straight-distance threshold is based on the machine's turning profile, its turning radius, and a tolerance of heading error of the machine at the target position 306. The value of the straight-distance threshold may be stored in the database 206, and is typically on the order of the length, or the wheel-base, of the work machine 100, although certainly other values may apply. In embodiments with a larger tolerance for heading error, the straight-distance threshold may be shorter than embodiments with a smaller tolerance for heading error. In the view 400 and in subsequent views, the magnitude of the straight-distance threshold may be exaggerated for clarity.

Here, the straight-distance threshold is located at a distance 412 from the target location 308, and the work machine 100 is located at a distance 410 from the target location 308. The distances 410 and 412 may not be displayed on the display unit 208. Thus, the distance 410 between the work machine 100 and the target location 308 is less than the distance 412 corresponding to the straight-distance threshold. Also depicted in the view 400, the actual orientation 304 is aligned with the target orientation 310 (e.g., the actual orientation 304 is parallel to the target orientation 310), and there is no lateral error (e.g., the work machine 100 is directly ahead of the target position 406).

The controller 202 may determine a route to maneuver the work machine 100 from the actual position having an actual location 302 and an actual orientation 304 to the target position 306 and display a path based on the determined route via the display unit 208. As such, when the distance between the actual location and the target location (e.g., distance 410) is less than the straight-distance threshold (e.g., distance 412), the route comprises a straight portion that is perpendicular to the target position 406. Here, the displayed path based on the determined route is depicted as the straight path 416. The straight path 416 is a straight path that is perpendicular to the target position 406. In some embodiments, the straight path 416 will appear as a static straight path that does not alter while the work machine 100 is within the straight-distance threshold. The straight path 416, as displayed, also extends from the target position 406 to the straight-distance threshold depicted at the straight-distance threshold point 414. In some embodiments, the paths may be displayed as a continuous line, a dotted line, a dashed line, or the like. In some embodiments, when the work machine 100 is within the straight-distance threshold, the displayed path consists of only the straight path and does not include a curved path.

Also depicted in the view 400 is an indicator 404 that is representative of a lateral offset of the work machine 100 to the target location 308. Because there is no lateral offset of the work machine 100 to the target position 406, the indicator 404 is directly behind (e.g., centered behind) the representation of machine 402 and is aligned with the straight path 416. In some embodiments, the indicator 404 is a t-shaped indicator. The t-shaped indicator includes a horizontal portion extending transverse to the heading of the work machine 100 and a vertical portion, perpendicular to the horizontal portion, that extends along a direction of the heading of the work machine 100. In some embodiments, the vertical portion of the indicator 404 extends towards the representation of the machine 402 (as depicted in the view 400), and in other embodiments, the vertical portion of the indicator 404 extends away from the representation of the machine 402.

The view 400 further includes a target position indicator 408. The target position indicator 408 may also have a "T" shape, similar to the indicator 404. The orientation of the target position indicator 408 may be similar to that of the indicator 404. The indicator 404 may be a first color on the display unit 208 and the target position indicator 408 may be a second color, different than the first color, on the display unit 208. For example, the indicator 404 may be depicted as a purple t-shaped indicator and the target position indicator 408 may be depicted as a red t-shaped indicator on the display unit 208.

The location of the indicator 404 relative to the representation of the machine 402 and the location of the target position indicator 408 relative to the target position 406 may both correspond to a dumping location of a payload of the work machine 100. For example, the dumping location may be based on the type of payload within the dump body 104, the speed of actuation of the pneumatic cylinders 106, the angle of the dump body 104, and the like.

When the work machine 100 is located within the target position 306, all of the representation of the machine 402 will be displayed within the target position 406. Further, the indicator 404 overlaps the target position indicator 408. In some such embodiments, when the work machine 100 is sufficiently within the target position 406, only a single indicator will display, and the single indicator may be a third color, different than the original colors of the indicator and the target position indicator. For example, before the work machine 100 is within the target position 406, the indicator 404 may display as a purple color and the target position indicator 408 may display as a red color. When the work machine 100 enters the target position 406 within sufficient tolerances (e.g., within 1 inch, within 1 foot, or within 1 yard, and within 0-5 degrees of tolerance), the indicator 404 and the target position indicator 408 merge and display as a single green indicator.

The view 400 further includes a left boundary 418 and a right boundary 420. The left boundary 418 and the right boundary 420 indicate the leftmost and rightmost, respectively, locations of the work machine 100 as the machine proceeds down the intended path or route. A distance between the left boundary 418 and the right boundary 420 corresponds to a width of the work machine 100. The view 400 may further be augmented with the locations of other machines, prohibited areas on the worksite, areas of low overhead clearance, and the like to further aid the operator in maneuvering the vehicle.

Figure 5:
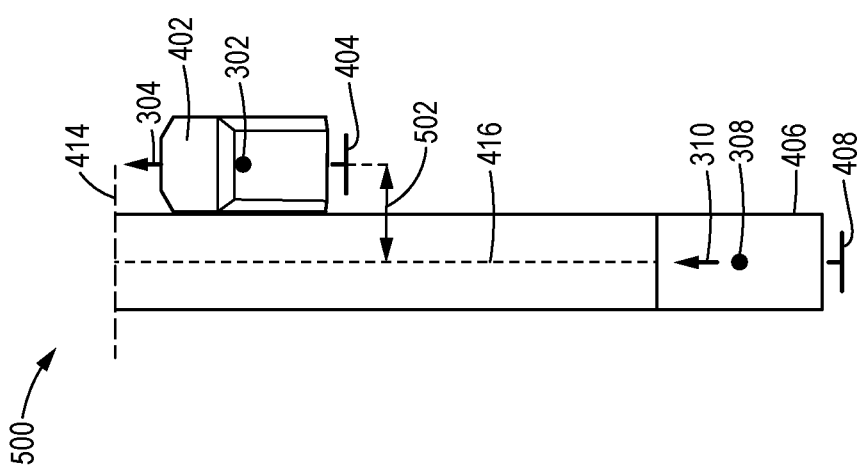
FIG. 5 is an exemplary view of a second scenario, in accordance with an embodiment of the present disclosure.

FIG. 5 is an exemplary view of a second scenario, in accordance with an embodiment of the present disclosure. In particular, FIG. 5 depicts the view 500 that is similar to the view 400 of FIG. 4. As in the view 400, the work machine 100 is located at a distance less than the straight-distance threshold and there is no orientation error. However, the work machine 100 includes a lateral offset 502 from the target position. In the view 500, because the work machine 100 is within the straight-distance threshold, it will not be able to back up to the target position 406 directly and be within desired tolerances. The controller 202 determines a route to maneuver the machine from the actual position to the target position. Because the distance between the actual location of the machine and the target location is less than the straight-distance threshold, the route includes a straight portion that is perpendicular to the target position 406. The straight portion is displayed as the straight path 416 extending perpendicularly from the target position 406. Because of the lateral offset, the straight path 416 does not intersect with the indicator 404. The view 500 provides the operator with information that the work machine 100 is off the track to backing up to the target position 406, and will likely need to proceed forward for another attempt at maneuvering to the target position 406.

Figure 6:
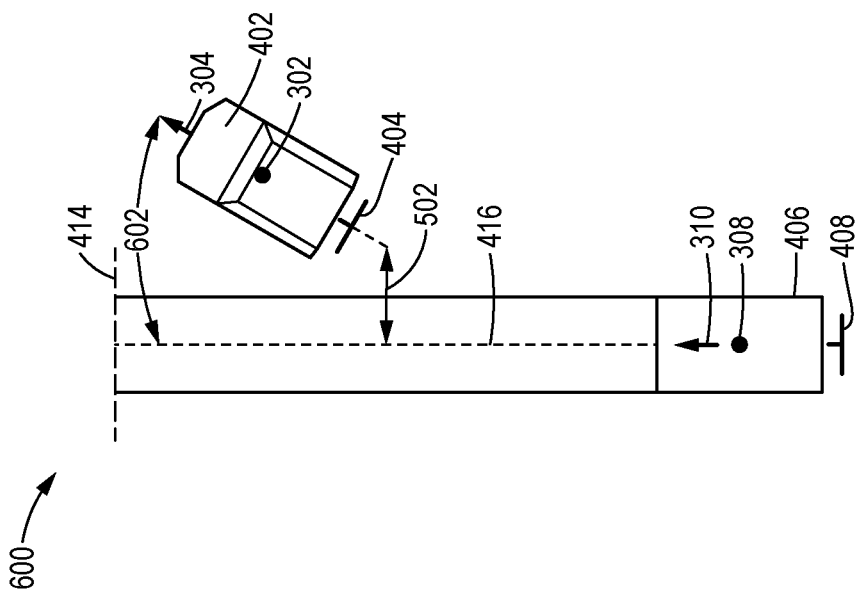
FIG. 6 is an exemplary view of a third scenario, in accordance with an embodiment of the present disclosure.

FIG. 6 is an exemplary view of a third scenario, in accordance with an embodiment of the present disclosure. In particular, FIG. 6 depicts the view 600 that is similar to the view 500 in that the machine is within the straight-distance threshold to the target position 406 and there is a lateral offset 502. However, the view 600 further includes an orientation difference 602 between the actual orientation 304 and the target orientation 310. The controller 202 may determine the orientation difference based on the target position 406 information and the position information of the work machine 100. Here, the indicator 404 is rotated clockwise corresponding to the determined orientation difference 602.

Figure 8:
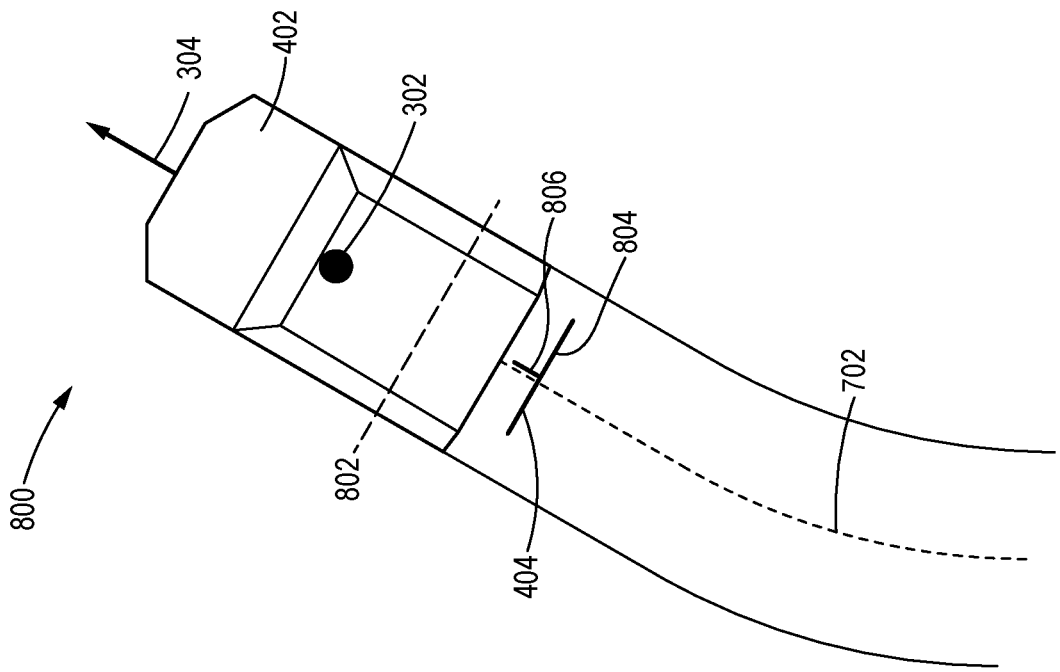
FIG. 8 is a close-up view of a portion of the fourth scenario, in accordance with an embodiment of the present disclosure.
Figure 7:
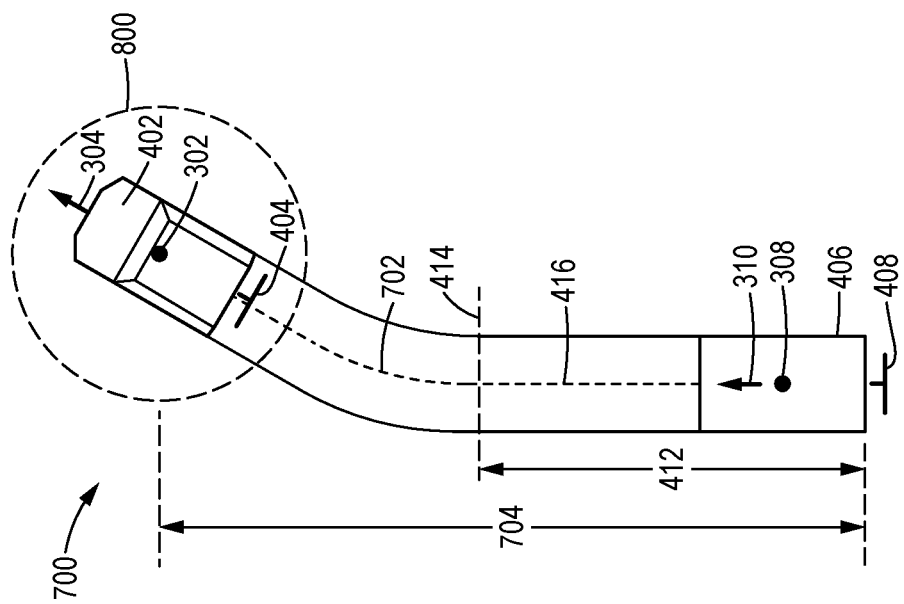
FIG. 7 is an exemplary view of a fourth scenario, in accordance with an embodiment of the present disclosure.

FIG. 7 is an exemplary view of a fourth scenario, and FIG. 8 is a close-up view of a portion of the fourth scenario, in accordance with an embodiment of the present disclosure. In particular, FIG. 7 depicts the overhead view 700 and FIG. 8 depicts the close-up view 800 of a portion of the overhead view 700 in the vicinity of the representation of the machine 402. The views 700 and 800 are similar to the view 600 of FIG. 6. However, unlike the view 600, the work machine 100 is located at a distance 704 greater than the straight-distance threshold in the views 700 and 800.

As such, when the controller 202 determines a route to maneuver the work machine 100 to the target position 406, the route includes both a curved portion between the actual position and the straight-distance threshold point and a straight portion between the straight-distance threshold point and the target position. A path, based on this determined route, is displayed via the display unit 208. In the view 700, this path includes the straight path 416 from the target position 406 to the straight-distance threshold depicted at the straight-distance threshold point 414 and a curved path 702 from the straight-distance threshold point 414 to the actual position. In some embodiments, the display of the curved path extends to a location of the rear axle 802 of the work machine 100.

The curved portion of the route is computable (e.g., by the controller 202, or by a computing device in communication with the operator assistance system 200), and is determined to align the work machine 100 in front of (e.g., no lateral offset) and on the correct heading (e.g., no orientation error) the target position 406 when the work machine 100 is at the straight distance threshold. Thus, the work machine 100 is able to back directly into the target position 406 without needing to translate left or right or adjust the heading. The curved portion of the route is based on the work machine 100 geometry and includes parameters such as a turning profile, a turning radius, and the like. The curved portion of the path may be determined to generate a smooth, natural, continuous and easily drivable trajectory between the actual position and the target position. The trajectory of the curved portion of the path may be reduced to reduce the rate of change of the sharpness of the curve.

The straight portion of the route is similar to the route depicted by the straight path 416 discussed in FIG. 4 and extends perpendicular from the target position 406 along the target orientation 310 to the straight-distance threshold point 414. In displaying the path based on the straight portion and the curved portion, the path is represented by a continuous smooth path as the two portions are joined together. In some embodiments, the path is generated in real-time and continually updated as the work machine 100 approaches the target position 406. In some embodiments, the displayed path is a solid line, a dashed line, a dotted line, or the like.

As depicted in the close-up view 800 of the view 700, the indicator 404 is a t-shaped indicator having the horizontal portion 804 and the vertical portion 806. The vertical portion 806 is located at a midpoint of the horizontal portion 804. Similar to the lateral offset of the work machine 100 to the target position 406 of the view 600, the work machine 100 in the views 700 and 800 is also located at a lateral offset from the target position 406 that is to the right, looking from above. As such, the display of the indicator 404 is representative of the lateral offset of the work machine 100 to the target position 406. In the close-up view 800, the indicator 404 is located to the right of the curved path 702 that is displayed along the centerline position of the work machine 100. The amount of translation of the indicator 404 to the right of the curved path 702 provides the operator an indication of the magnitude of the lateral offset.

Figure 9:
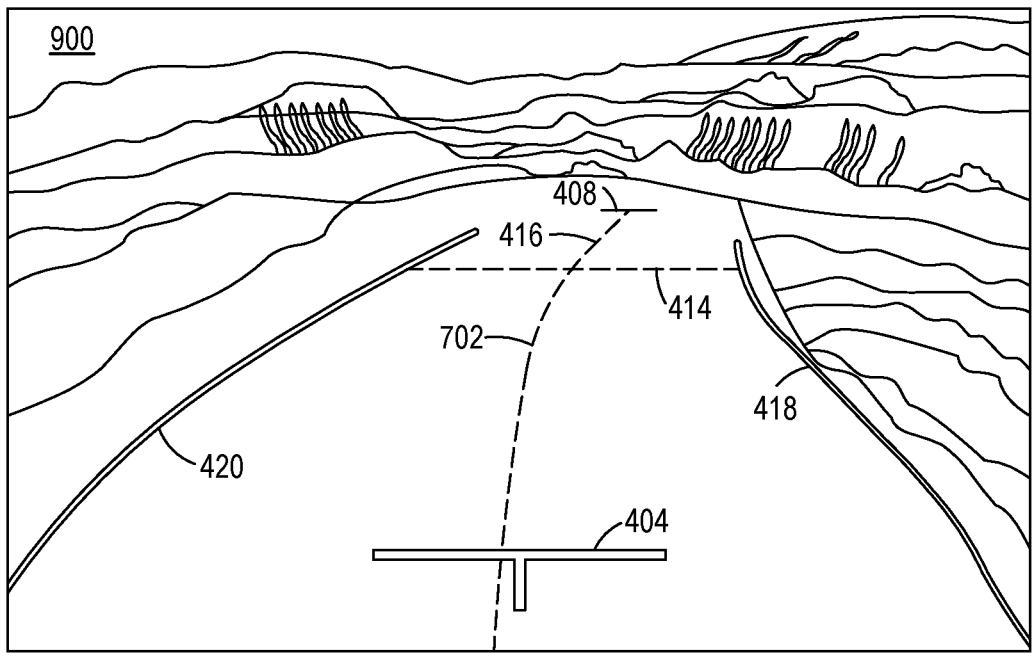
FIG. 9 is a view of an augmented rear-view camera video, in accordance with an embodiment of the present disclosure.

FIG. 9 is a view of an augmented rear-view camera video, in accordance with an embodiment of the present disclosure. In particular, FIG. 9 depicts the view 900 that represents a view on the display unit 208 that occurs in some embodiments. In particular, the view 900 depicts a video from a rear-facing camera on the work machine 100 (e.g., the image capturing device 210) that is augmented with the features disclosed herein. As compared to the overhead views similar to the view 400, the view 900 augments the video to display the path and indicators to the operator. The view 900 may be a live version of a video feed from a rear-facing camera. The augmented features overlaid on the video feed may include the indicator 404, the curved path 702, the straight path 416, the straight-distance threshold point 414, the left boundary 418, the right boundary 420, and the target position indicator 408. Additional features, such as the target position 406, other hazards, distances to various objects, and the like may also be displayed. Here, the indicator 404 is depicted at the bottom of the view 900, representing a position near the rear of the work machine 100. The curved path 702 extends from the bottom of the view up to the straight-distance threshold point 414 where the path transitions to the straight path 416. The straight path 416 continues until the target position indicator 408.

Here the view 900 represents a display when the work machine 100 is at a distance from the target position 406 greater than the straight-distance threshold, an orientation error to the left when viewed from an overhead view, and a lateral offset to the left when viewed from an overhead view. As such, the indicator 404 (e.g., the vertical portion) is displayed to the right of the curved path 702 to account for the lateral offset and the target position indicator 408 is rotated to the right relative to the indicator 404 to account for the orientation error. Also, the target position indicator 408 is displayed at a reduced size as compared to the indicator 404. This is in part because of the perspective view of the video. The size of the target position indicator 408 may increase as the work machine 100 approaches the target position 406.

It should be noted that additional modifications may be made to the operator assistance system 200 and/or to the views 400, 500, 600, and 700 represented on the display unit 208, other than the ones described herein, without departing from the intended scope of the disclosure.

INDUSTRIAL APPLICABILITY

Work machines like haul trucks, mining trucks, tankers and the like need to be loaded with materials in order to transport them. For loading materials on the truck, the truck may be required to be positioned and oriented appropriately on a loading area like near a shovel, a conveyor unloading point, etc. Additionally, trucks may need to back up to a position to dump a payload at a desired location. Often, the truck requires to be backed up to the target position. The systems and method disclosed herein provide an operator of a machine with additional information to properly maneuver a machine to a target position.

Figure 10:
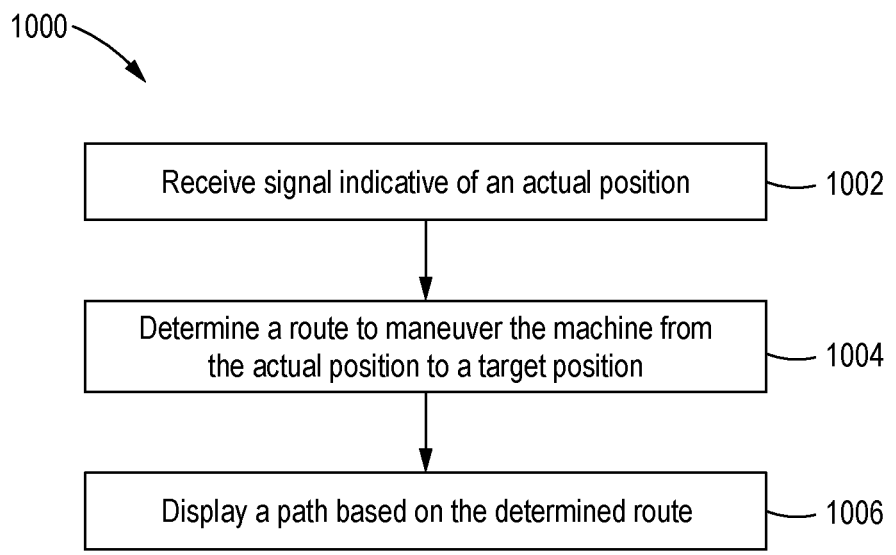
FIG. 10 depicts a method, in accordance with an embodiment of the present disclosure.

FIG. 10 depicts a method, in accordance with an embodiment of the present disclosure. In particular, FIG. 10 depicts the method 1000 that may be performed via the work machine 100 having a display unit configured to display the views contained herein. By way of example, the method 1000 is used to disclose a method of displaying the view 700 of FIG. 7 via the operator assistance system 200 of FIG. 2.

The method 1000 includes receiving a signal indicative of an actual position at step 1002, determining a route to maneuver the machine from the actual position to a target position at 1004, and displaying a path based on the determined route at 1006.

At the step 1002, the controller 202 receives, from the position detection module 204, a signal indicative of an actual position of the work machine 100. The actual position includes an actual location 302 and an actual orientation 304. In some embodiments, the controller 202 determines a relative distance and a relative orientation error to a target position.

At the step 1004, the controller 202 determines a route to maneuver the work machine 100 from the actual position to the target position 306, the target position 306 having a target location 308 and a target orientation 310. If a distance between the actual location and the target location is greater than a straight distance threshold, the route comprises a curved portion between the actual position and a straight-distance threshold point and a straight portion between the straight-distance threshold point and the target position 306. However, if the distance between the actual location and the target location is less than a straight distance threshold, the route comprises a straight portion that is perpendicular to the target position. The straight distance threshold may correspond to a target orientation tolerance and a turning radius, or turning profile, of the work machine 100. This corresponds to a distance that the machine is unable to appreciably change its orientation and in some embodiments corresponds to approximately the length of the work machine 100.

At the step 1006, the display unit 208 displays, to the operator of the work machine 100, a path based on the route and displays an indicator 404 representative of a lateral offset of the work machine 100 to the target location 308. Thus, in the view 700, the indicator 404, displayed as a t-shaped indicator, is displayed along with the curved path 702 and the straight path 416. In some embodiments, the display unit 208 may further display the target position indicator 408 which may also have a t-shape, the straight-distance threshold point 414, or a representation of the machine 402. The indicator 404 is displayed to the right of the curved path 702 because of a corresponding lateral offset between the actual location 302 of the work machine 100 and the target location 308. Further, the indicator 404 is also rotated to the right indicative of an orientation error (e.g., as determined by the controller 202, the position detection module 204 or the like) between the actual orientation 304 and the target orientation 310. The indicator 404 may be displayed as a first color and the target position indicator 408 may be displayed as a second color different than the first color. The representation of the machine 402 may be displayed at its actual location and actual orientation relative to the target location and the target orientation.

However, if the distance between the actual location and the target location is less than the straight-distance threshold, the route comprises the straight portion that is perpendicular to the target position, and would appear similar to the views 400, 500, and 600, depending on the actual location and actual position of the work machine 100 relative to the target position 306.

While the view 700 depicts a display unit 208 displaying an overhead view of the worksite 300, it is envisioned that the display unit 208 may also display as an overlay of augmentations over a rear view camera feed, such as the view 900 depicted in FIG. 9.

While aspects of the present disclosure have been particularly shown and described with reference to the aspects of the current disclosure above, it will be understood by those skilled in the art that various additional aspects of the current disclosure may be contemplated by the modification of the disclosed machines, systems and methods without departing from the spirit and scope of what is disclosed. Such aspects of the current disclosure should be understood to fall within the scope of the present disclosure as determined based upon the claims and any equivalents thereof.

What is claimed is:

1. A method of maneuvering a work machine about a worksite, the method comprising:
    receiving a signal indicative of an actual position of a work machine, the actual position having an actual location and an actual orientation of the work machine;
    determining a route to maneuver the work machine from the actual position to a target position, the target position having a target location and a target orientation, wherein:
        when a distance between the actual location and the target location is greater than a straight-distance threshold, the route comprises a curved portion between the actual position and a straight-distance threshold point and a straight portion between the straight-distance threshold point and the target position; and
        when the distance between the actual location and the target location is less than the straight-distance threshold, the route comprises the straight portion is between the straight-distance threshold point and the target position; and
    displaying, on a display unit to an operator of the work machine, a path based on the route, an indicator representative of a lateral offset of the work machine to the target location and the straight-distance threshold point; and
    maneuvering, by the operator, the work machine along the path displayed on the display unit, wherein when the actual location of the work machine is within the straight-distance threshold, and the work machine is laterally offset to the target location or the actual orientation of the work machine differs from the target orientation, maneuvering the work machine outside the straight-distance threshold and determining a new route.

2. The method of maneuvering the work machine about a worksite of claim 1, wherein the indicator is a t-shaped indicator.

3. The method of maneuvering the work machine about a worksite of claim 2, further comprising displaying, to the operator of the work machine, a target position indicator, the target position indicator having a "T" shape.

4. The method of maneuvering the work machine about a worksite of claim 3, wherein the indicator is a first color and the target position indicator is a second color different than the first color.

5. The method of maneuvering the work machine about a worksite of claim 3, further comprising displaying, a representation of the work machine at the actual location and the actual orientation relative to the target location and the target orientation.

6. The method of maneuvering the work machine about a worksite of claim 5, wherein a displayed position of the indicator relative to the representation of the work machine corresponds to a dumping location of a payload of the work machine.

7. The method of maneuvering the work machine about a worksite of claim 1, the method further comprising determining an orientation difference between the actual orientation and the target orientation, wherein displaying the indicator further includes rotating the indicator based on the orientation difference.

8. The method of maneuvering the work machine about a worksite of claim 1, wherein the straight-distance threshold is based on a target orientation tolerance and a turning radius of the work machine.

9. The method of maneuvering the work machine about a worksite of claim 1, wherein the route and the indicator are displayed on an overhead-view display.

10. The method of maneuvering the work machine about a worksite of claim 1, wherein the route and the indicator are displayed on an overlay on a video of a back-up camera.

11. A system for assisting an operator to maneuver a work machine on a worksite, the system comprising:
    a position detection module configured to generate a signal indicative of an actual position having an actual location and an actual orientation of the work machine;
    a display unit; and
    a controller communicably coupled to the position detection module and the display unit, the controller configured to:
        receive the signal indicative of the actual position of the work machine;
        determine a route to maneuver the work machine from the actual position to a target position having a target location and a target orientation, wherein:
            when a distance between the actual location and the target location is greater than a straight-distance threshold, the route comprises a curved portion between the work machine a straight-distance threshold point and a straight portion between the straight-distance threshold point and the target position; and
            when the distance between the actual location and the target location is less than the straight-distance threshold, the route comprises the straight portion between the straight-distance threshold point and the target position;
        display a path based on the route;
        display an indicator representative of a lateral offset of the work machine to the target position; and
        display the straight-distance threshold point.

12. The system of claim 11, wherein the indicator is a t-shaped indicator.

13. The system of claim 12, further comprising displaying a target position indicator and a representation of the work machine at the actual position relative to the target position, wherein the path, the indicator, the target position indicator, and the representation of the work machine are displayed on an overhead view of the worksite.

14. The system of claim 13, wherein a displayed position of the indicator relative to the representation of the work machine corresponds to a dumping location of a payload of the work machine.

15. The system of claim 12, further comprising displaying a target position indicator, wherein displaying the path, the indicator, and the target position indicator, comprises overlaying the path, the indicator, and the target position on a video of a back-up camera.

16. The system of claim 15, wherein a location of the indicator overlaid on the video of the back-up camera corresponds to a dumping location of a payload of the work machine.

17. The system of claim 11, wherein the controller is further configured to determine an orientation difference between the actual orientation and the target orientation, and displaying the indicator further includes rotating the indicator based on the orientation difference.

18. The system of claim 11, wherein the straight-distance threshold is based on a target orientation tolerance and a turning radius of the work machine, and wherein the straight-distance threshold corresponds to a distance from the target location at which maneuvering the work machine to change the actual orientation of the work machine is restricted.

19. A work machine comprising:
    a frame supported by a plurality of ground engaging members, wherein:
        two ground engaging members in the plurality of ground engaging members are configured to turn the frame of the work machine along a turning radius;
    a position detection module configured to generate a signal indicative of an actual position having an actual location and an actual orientation of the work machine;
    a display unit; and
    a controller communicably coupled to the position detection module and the display unit, the controller configured to:
        receive the signal indicative of the actual position of the work machine;
        determine a route to maneuver the work machine from the actual position to a target position having a target location and a target orientation, wherein:
            when a distance between the actual location and the target location is greater than a straight-distance threshold, the route comprises a curved portion between the work machine and a straight-distance threshold point and a straight portion between the straight-distance threshold point and the target position; and
            when the distance between the actual location and the target location is less than the straight-distance threshold, the route comprises the straight portion between the straight-distance threshold point and the target position;
        display a path based on the route;
        display a target position indicator representative of the target location and the target orientation of the work machine;
        display an indicator representative of a lateral offset of the work machine to the target position; and
        display the straight-distance threshold point, wherein the straight-distance threshold corresponds to a distance from the target location at which maneuvering the work machine to change the actual orientation of the work machine is restricted.

20. The work machine of claim 19, wherein the path, the target position indicator, and the target position are displayed in an overhead view.

* * * * *